US006470274B1

(12) United States Patent
Mollison et al.

(10) Patent No.: US 6,470,274 B1
(45) Date of Patent: Oct. 22, 2002

(54) WATER SATURATION AND SAND FRACTION DETERMINATION FROM BOREHOLE RESISTIVITY IMAGING TOOL, TRANSVERSE INDUCTION LOGGING AND A TENSORIAL DUAL WATER SATURATION MODEL

(75) Inventors: Richard A. Mollison, Tomball; Otto N. Fanini, Houston; Berthold Kriegshauser, Houston; Milomir Pavlovic, Houston, all of TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/539,053

(22) Filed: Mar. 30, 2000

Related U.S. Application Data

(63) Continuation-in-part of application No. 09/474,049, filed on Dec. 28, 1999, and a continuation-in-part of application No. 09/222,967, filed on Dec. 30, 1998, now abandoned.
(60) Provisional application No. 60/160,943, filed on Oct. 22, 1999.

(51) Int. Cl.$^7$ ............................................. G01V 3/38
(52) U.S. Cl. .................................... 702/7; 702/12
(58) Field of Search ............................ 702/6, 7, 8, 10, 702/11, 12, 13; 324/303, 338, 339

(56) References Cited

U.S. PATENT DOCUMENTS

| 5,355,088 | A | | 10/1994 | Howard, Jr. | ................. 324/339 |
| 5,463,549 | A | | 10/1995 | Dussan et al. | ............... 364/422 |
| 5,671,136 | A | | 9/1997 | Willhoit, Jr. | ................. 364/421 |
| 5,781,436 | A | | 7/1998 | Forgang et al. | ............. 364/422 |
| 5,812,068 | A | * | 9/1998 | Wisler et al. | ................. 175/40 |
| 5,854,991 | A | | 12/1998 | Gupta et al. | ................... 702/7 |
| 6,218,841 | B1 | * | 4/2001 | Wu | ............................. 324/338 |

OTHER PUBLICATIONS

J.D. Klein, P.R. Martin, D.F Allen; "The Petrophysics of Electrically Anisotropic Reservoirs," The Log Analyst, May–Jun. 1997, pp. 25–36; Technical Note, Saturation Effects on Electrical Aniostrophy, J.D. Klein, Jan.–Feb. 1996, pp. 47–49.
T.D. Barber and R.A. Rosthal, "Using a Multiarray Induction Tool to Achieve High–Resolution Logs With Minimum Environmental Effects," SPE 66th Annual Technical Conference and Exhibition, 1991, SPE 22725, pp. 637–651.
T. Barber, et al., "A Multiarray Induction Tool Optimized for Efficient Wellsite Operation," 1995 Annual Technical Conference and Exhibition, 1995, SPE 30583, pp. 549–561.
D.R. Beard, et al., "A New, Fully Digital, Full–Spectrum Induction Device for Determining Accurate Resistivity with Enhanced Diagnostic and Integrity Verification," SPWLA 37th Annual Logging Symposium, Jun. 16–19, 1996, Paper B, pp. 1–8, Figs. 1–17.
Dave Beard, et al., "Practical Applications of a New Multichannel and Fully Digital Spectrum Induction System," 1996 SPE Annual Technical Conference and Exhibition, Oct. 6–9, 1996, SPE 36504, pp. 99–109.

(List continued on next page.)

Primary Examiner—Donald E. McElheny, Jr.
(74) Attorney, Agent, or Firm—Madan, Mossman & Sriram, P.C.

(57) ABSTRACT

The total porosity of said formation, a fractional volume of the shale, and a resistivity of the shale are determined in a laminated reservoir including sands that may have dispersed shales therein. A tensor petrophysical model determines the laminar shale volume and laminar sand conductivity from vertical and horizontal conductivities derived from multi-component induction log data. NMR data are used to obtain measurements of the total clay-bound water in the formation and the clay bound water in shales in the formation.

25 Claims, 5 Drawing Sheets

OTHER PUBLICATIONS

Teruhiko Hagiwara, ""Macroscopic Anisotrophy" Approach to Analysis of Thinly Laminated Sand/Shale Sequences: Sensitivity Analysis of Sand Resistivity Estimate and Environmental Corrections," 1997 SPE Annual Technical Conference and Exhibition, Oct. 5–8, 1997, SPE 38669, pp. 275–286.

J. Xiao, et al., "A Practical Dipping–Effect Correction for Multiarray Induction Tools In Deviated Wells," SPWLA 37th Annual Logging Symposium, Jun. 16–19, 1996, pp. 1–5, Figs. 1–12.

J. Xiao, et al., "A Petrophysics–Based Resolution–Enhancement Technique for Array–Type Induction Logs," SPWLA 39th Annual Logging Symposium, May 26–29, 1998, Paper XX, pp. 1–14.

Q. Zhou, et al., "Numerical Focusing of Induction Logging Measurements," 12th workshop in electromagnetic induction in earth, International Union of Geodesy and Geophysics. Aug. 8–14, 1994, pp. 1–6, Figs. 1–4.

A. Poupon et al., "A Contribution to Electrical Log Interpretation in Shaly Sands," Petroleum Branch Fall Meeting, Oct. 19–21, 1953, T. P. 3800, pp. III–113–III–120.

M. H. Waxman, "Electrical Conductivities in Oil–Bearing Shaly Sands," SPE 42nd Annual Fall Meeting, Oct. 1–4, 1967, pp. V–145–V160.

* cited by examiner

WATER SATURATION AND SAND FRACTION DETERMINATION FROM BOREHOLE RESISTIVITY IMAGING TOOL, TRANSVERSE INDUCTION LOGGING AND A TENSORIAL DUAL WATER SATURATION MODEL

CROSS-REFERENCES TO RELATED APPLICATIONS

This application is a continuation-in-part of U.S. patent application Ser. No. 09/222,967 filed on Dec. 30, 1998, abandoned, and a continuation-in-part of U.S. patent application Ser. No. 09/474,049 filed on Dec. 28, 1999. It further claims priority from U.S. Provisional Application Ser. No. 60/160,943 filed on Oct. 22, 1999.

BACKGROUND OF THE INVENTION

1. Field of the Invention

The invention is related generally to the field of interpretation of measurements made by well logging instruments for the purpose of determining the fluid content of earth formations. More specifically, the invention is related to methods for calculating fractional volumes of various fluids disposed in the pore spaces of earth formations where these earth formations include laminations of shale or laminated shale distribution with reservoir rock that may include dispersed shales.

2. Background of the Art

A significant number of hydrocarbon reservoirs include deep water turbidite deposits that consist of thin bedded, laminated sands and shales. A common method for evaluating the hydrocarbon content of reservoirs is the use of resistivity measurements. In interpretation techniques known in the art, typically one or more types of porosity-related measurement will be combined with measurements of the electrical resistivity (or its inverse, electrical conductivity) of the earth formations to infer the fluid content within the pore spaces of the earth formations. The fractional volumes of connate water and hydrocarbons can be inferred from empirical relationships of formation resistivity Rt with respect to porosity and connate water resistivity such as, for example, the well known Archie relationship. In the Archie relationship fractional volume of water in the pore space is represented, as shown in the following expression, by Sw—known as "water saturation":

$$S_w^n = \frac{R_0}{R_t} = \frac{1}{R_t}\frac{aR_w}{\phi^m} \quad (1)$$

where a and m are empirically determined factors which relate the porosity (represented by $\Phi$) to the resistivity of the porous rock formation when it is completely water-saturated ($R_0$), $R_w$ represents the resistivity of the connate water disposed in the pore spaces of the formation, and m represents an empirically determined "icementation" exponent, n is the saturation exponent.

Relationships such as the Archie formula shown in equation (1) do not work very well when the particular earth formation being analyzed includes some amount of extremely fine-grained, clay mineral-based components known in the art as "shale". Shale typically occurs, among other ways, in earth formations as "dispersed" shale, where particles of clay minerals occupy some of the pore spaces in the hydrocarbon-bearing earth formations, or as laminations (layers) of clay mineral-based rock interleaved with layers of reservoir-type rock in a particular earth formation.

In the case of dispersed shale, various empirically derived relationships have been developed to calculate the fractional volume of pore space which is capable of containing movable (producible) hydrocarbons. The fractional volume of such formations which is occupied by dispersed shale can be estimated using such well logging devices as natural gamma ray radiation detectors. See for example, M. H. Waxman et al, "Electrical Conductivities in Oil Bearing Shaly Sands", SPE Journal, vol. 8, no. 2, Society of Petroleum Engineers, Richardson, Tex. (1968).

In the case of laminated shale, the layers sometimes are thick enough to be within the vertical resolution of, and therefore are determinable by, well logging instruments such as a natural gamma ray detector. In these cases, the shale layers are determined not to be reservoir rock formation and are generally ignored for purposes of determining hydrocarbon content of the particular earth formation. A problem in laminated shale reservoirs is where the shale laminations are not thick enough to be fully determined using gamma ray detectors and are not thick enough to have their electrical resistivity accurately determined by electrical resistivity measuring devices known in the art.

Sands that have high hydrocarbon saturation are typically more resistive than shales. In reservoirs consisting of thin laminations of sands and shales, conventional induction logging tools greatly underestimate the resistivity of the reservoir: the currents induced in the formation by the logging tool flow preferentially through the conductive shale laminations creating a bias towards a higher formation conductivity. This could lead to an underestimation of hydrocarbon reserves.

One method for estimating hydrocarbon content of earth formations where shale laminations are present was developed by Poupon. See A. Poupon et al, "A Contribution to Electrical Log Interpretation in Shaly Sands", Transactions AIME, Vol. 201, pp. 138–145 (1959). Generally the Poupon relationship assumes that the shale layers affect the overall electrical conductivity of the earth formation being analyzed in proportion to the fractional volume of the shale layers within the particular earth formation being analyzed. The fractional volume is typically represented by Vsh (shale "volume"). Poupon's model also assumes that the electrical conductivity measured by the well logging instrument will include proportional effects of the shale layers, leaving the remainder of the measured electrical conductivity as originating in the "clean" (non-shale bearing) reservoir rock layers as shown in the following expression:

$$\frac{1}{R_t} = (1 - V_{sh})\left(\frac{aR_w}{\phi^n}\right)^{-1} S_w^n + \frac{V_{sh}}{R_{sh}} \quad (2)$$

where $R_t$ represents the electrical resistivity (inverse of conductivity) in the reservoir rock layers of the formation and $R_{sh}$ represents the resistivity in the shale layers.

The analysis by Poupon overlooks the effect of anisotropy in the resistivity of a reservoir including thinly laminated sands and shales. Use of improper evaluation models in many cases may result in an underestimation of reservoir producibility and hydrocarbon reserves by 40% or more as noted by van den Berg and Sandor. Analysis of well logging instrument measurements for determining the fluid content of possible hydrocarbon reservoirs includes calculating the fractional volume of pore space ("porosity") and calculating the fractional volumes within the pore spaces of both hydrocarbons and connate water. As noted above, Archie's relationship may be used.

In thinly laminated reservoirs where the wavelength of the interrogating electromagnetic wave is greater than the thickness of the individual layers, the reservoir exhibits an anisotropy in the resistivity. This anisotropy may be detected by using a logging tool that has, in addition to the usual transmitter coil and receiver coil aligned along with the axis of the borehole, a receiver or a transmitter coil aligned at an angle to the borehole axis. Such devices have been well described in the past for dip determination. See, for example, U.S. Pat. No. 3,510,757 to Huston and U.S. Pat. No. 5,115,198 to Gianzero, U.S. Pat. No. 5,656,930 issued to Hagiwara discloses a method of determining the horizontal resistivity, the vertical resistivity, and the anisotropy coefficient of a subterranean formation by means of an induction type logging tool positioned in a deviated borehole within the subterranean formation. In a preferred implementation, the induction type logging tool is first calibrated to determine a proportionality constant. A predetermined relationship between the proportionality constant, the phase shift derived resistivity, the attenuation derived resistivity, the horizontal resistivity, the vertical resistivity, and the anisotropy coefficient is then generated and stored in the memory of a programmed central processing unit. During an induction logging operation, the phase shift derived resistivity and attenuation derived resistivity are then received and processed by the programmed central processing unit in accordance with the predetermined relationship to generate the horizontal resistivity, the vertical resistivity, and the anisotropy coefficient. These measured values of horizontal and vertical resistivities when combined with a predetermined relationship between the horizontal resistivity, the vertical resistivity, the net/gross ratio, and the ratio of the sand layer resistivity to the shale layer resistivity make it possible to obtain a net/gross ratio. However, there are many laminated reservoirs in which the sands may include dispersed shales. Interpretation of formation water saturation in such reservoirs can be in error if the combined effects of laminations, dispersed shales within the sand, and possible intrinsic anisotropy of the shales is not considered.

A "dual water" model was developed initially by Clavier, et al., 1977 and 1984. This petrophysical model was later modified and "simplified" by Coates, Boutemy, and Clavier, 1982, and Coates, Schultz, and Throop, 1982, which was subsequently marketed as Schlumberger Cyberlook™ and VOLAN™ 'dual water' analysis, respectively. Coates and Howard, 1992, used this technique in a further simplified analysis method called MIRIAN™ (Numar) where the Archie parameters for cementation exponent 'm' and saturation exponent 'n' are combined into a single, empirically derived textural parameter 'w' based on a permeability model published by Coates, et al., 1982. These models lack the ability to physically represent the shale distribution (laminar, dispersed, structural) in shaly sand formations and are dependent on empirical transforms, based on local experience and empirically derived data to resolve the petrophysical effects of shale distribution in 'shaly sand' formations. These limitations result from the single resistivity scalar measurements on which these models are based and the use of 'bulk volume' or averaged wireline porosity tool data.

Patchett and Herrick, 1982, described a volumetrically correct general petrophysical model by combining the Poupon, 1954 laminar shale saturation equation with the WS dispersed shale equation. However, this model was based on a single, scalar horizontal resistivity measurement that is dominated by the parallel conductivity effects of the laminar shales in shaly sand formations. This results in a very low confidence level in the subsequent analysis in any formation that has significant volumes of laminar shale. Patchett and Herrick noted that the laminar sand fraction porosity must be determined using a Thomas-Stieber, 1975, (TS) approach and not a bulk volume shale corrected "effective porosity" as is typically done with traditional empirical methods as used by Ruhovets and Fertl, 1982, in the CLASS™ model.

Juhasz, 1981, proposed a 'dual water' form of the WS equation and discussed the proper use of the TS porosity model. However, again lacking any quantitative method to discriminate volumes of laminar and dispersed shale volumes, Juhasz proposed that a bulk volume shale bound water saturation term, "Qvn", which could be derived from log data and to replace the WS B•Qv shale conductivity term. Corrections for shale effects were then applied to the calculated 'bulk volume' water saturation on a 'net pay' basis using a simple derivation of the TS shale distribution model. Juhasz did not show how to correct for situations where both laminar and dispersed shale occurred together, simply stating that this was 'beyond the scope of a simple model'. His discussions on the theory and basis for both the TS and WS model developed at Shell research were correct. However, Juhasz's final implementation of the petrophysical model exhibited the same shortcomings of all 'bulk volume shale' models in properly characterizing shaly formations. Juhasz's technical discussions in his 1979, 1981, and 1986 papers, on Qv, effective porosity, bound water distribution as a function of shale type, proper correction of porosity for shale distribution, and dispersed shale 'bound water conductivity' form the basis of a new 'tensor dual water' method proposed herein. This new method is combined with the 'tensor model' to determining the dispersed shale bound water conductivity, Cwb, from laminar shale corrected cross plots or direct substitution of Qv determined from the Hill, Shirley, and Klein, 1975, equation. This model correctly describes the bound water conductivity component, Cwb, isolated specifically to the dispersed shale fraction. This method is shown to be theoretically correct and conceptually equivalent to the WS B•Qv dispersed shale conductivity term.

There is a need for a method of determining the properties of a laminat ed reservoir that includes shales, clean sands and sands having dispersed clay therein. Such a method should preferably determine the water saturation of the sands in order to give a more accurate estimate of the productive capacity of the reservoir. Such a method should preferably be consistent with the Waxman-Smits model for dispersed shale as well as the dual-water model for the bound water in a reservoir. Such a method should preferably make as few assumptions as possible about the properties of the sands and the shales. The present invention satisfies this need.

SUMMARY OF THE INVENTION

The present invention is method of accounting for the distribution of shale and water in a reservoir including laminated shaly sands using vertical and horizontal conductivities derived from multi-component induction data. Along with an induction logging tool, data may also be acquired using a borehole resistivity imaging tool. The data from the borehole resistivity imaging tool give measurements of the dip angle of the reservoir, and the resistivity and thickness of the layers on a fine scale. The measurements made by the borehole resistivity imaging tool are calibrated with the data from the induction logging tool that gives measurements having a lower resolution than the borehole resistivity imaging tool. A tensor petrophysical model determines the laminar shale volume and laminar sand conductivity from vertical and horizontal conductivities derived from the log data. The volume of dispersed shale, the total and effective porosities of the laminar sand fraction as well as the effects of clay-bound water in the formation are determined.

The present invention is a method for determination of laminar sand conductivity using vertical and horizontal conductivity components measured with the a suitable logging tool such as a transverse induction tool or a wave propagation tool. For convenience, these measurements will be referred to as "TILT measurements" or "3-D induction measurements" and it is to be understood that any method of measuring horizontal and vertical resistivities may be used. In one embodiment of the invention, the sand and the laminar shale are assumed to be isotropic. In a second embodiment of the invention, the sand is assumed to be isotropic while the laminar shale is assumed to be anisotropic. In a third embodiment of the invention, both the sand and the laminar shale are anisotropic.

For the case where both the sand and the laminar shale are isotropic, the laminar shale volume must be determined using an 'external' method such as a resistivity imaging tool or from a Thomas Stieber (TS) shale distribution model. The laminar sand conductivity component is determined in all cases from a tensor petrophysical model using the transverse induction measurements. The total and effective porosity of the laminar sand fraction must be determined using the methodology developed by TS and uses either the laminar shale volume from TILT and/or the TS model calculated laminar shale volume.

These laminar sands, interbedded with the laminar shales determined from transverse logging data, generally contain a second, pore filling shale fraction that is termed "dispersed shale". This shale fraction adds a second 'parallel' conductivity pathway through the pore space that increases the 'apparent' total conductivity of the sand versus what would be measured if the sands were only to contain conductive formation water 'brines'. This effect has been well documented by Hill and Milbum, 1955, Waxman and Smits 1968, Hill, Shirley, and Klein, 1975, Thomas 1976, Juhasz, 1979, and is quantified in the widely used WS water saturation equation. Hill, Shirley and Klein (HSK) demonstrated that this conductivity term, Qv, could be empirically approximated if the salinity of the formation brine, in equivalents NaCl was known and the shale bound water volume was known.

Although TS and Juhasz demonstrated how to calculate total and effective porosity of the laminar sand fraction, they did not extend this to the calculation of shale bound water, which is $$\frac{\left(\phi_{total-lamrsand} \cdot \phi_{effective-lamrarsand}\right)}{\phi_{total-lamrsand}}$$

Although this is intuitive and used in a bulk volume analysis in 'traditional bulk volume methods', it is critical that the laminar sand fraction of shale bound water be determined ONLY from laminar sand properties to be correct. Secondly, and more importantly, the laminar shale bound water volume cannot be used in the calculation of sand fraction shale bound water volume or the HSK Qv. The tensor petrophysical model correctly removes this component and correctly calculates the laminar sand fraction conductivity, porosities, and dispersed shale bound water volume.

A second method of determining the dispersed shale bound water volume is used in the present invention when the clay bound water (CBW) volume is measured directly. This may be obtained from Nuclear Magnetic Resonance measurements wherein the distribution of relaxation times may be used to give the CBW using known methods. By calibrating the maximum CBW to 100% shale ($CBW_{shale}$), the ratio of CBW to shale volume is determined. The TILT laminar shale volume times the $CBW_{shale}$ gives the laminar shale CBW ($CBW_{laminar}$) in any interval. By subtracting $CBW_{laminar}$ component from the total NMR measured CBW, the remaining CBW, by definition, is the dispersed shale bound water volume, $CBW_{dispersed}$. This is a direct solution without defining the clay/shale parameters of the dispersed component, which has always been a problem in petrophysical analysis. Thus Qv of the laminar sand fraction can be determined directly and quantitatively from the TILT laminar shale volume and NMR CBW and results in the correct results for water saturation of the laminar sand fraction using the Waxman-Smits (WS) equation. This method correctly determines the laminar and dispersed shale volume components, thus reducing the volumetric analysis to a purely 'dispersed shaly sand problem'. This is a 'theoretically' correct way to use the WS method and provides a direct solution for Qv from NMR CBW data.

The present invention is a volumetrically correct petrophysical model to use these published methodologies. Methods published by Patchett-Herrick, 1982, only postulated the correction of the WS equation for laminar shale conductivity based on the Poupon, 1954, equation and only footnoted that traditional 'bulk volume' total or effective porosity was incorrect. They did not postulate on how to determine laminar shale volume, dispersed shale Qv, or dispersed shale bound water volume and conductivity. Prior to the invention of, laminar shale volume could only be determined indirectly from the TS model. The Juhasz, 1981, "Normalized Qv" (Swb) model incorrectly uses the 'bulk volume shale' as does the Cyberlook dual water and suffers from the inherent inaccuracy associated with applying the laminar shale properties to the pore filling, dispersed shales A dual water form of the WS equation is disclosed based on the Juhasz, 1981 publication. Juhasz presented a substitution of the B•Qv term in the WS equation with the equivalent 'dual water' terms Cwb and Swb, the clay bound water conductivity and clay bound water saturation, respectively. Juhasz demonstrated that by graphically presenting the WS equation, that when Juhasz' Qvn (Swb), the shale bound water saturation is equal to 1, B•Qv=Cwb−Cw (where Cw is the conductivity of the 'free' formation water).

The present invention uses the HSK equation to directly replace Qv and the Cwb term solved for. In the 'traditional dual water model', the Cwb term is approximated from the conductivity of the laminar shales adjacent to the sands of interest. This is incorrect because the bedded, laminar shales are generally of different clay type and bound water volume than dispersed shales. Laminar shale are 'detrital' or formed from the transport and deposition of clay minerals, silt, and other materials. Dispersed 'shales' are frequently authogenic, forming from chemical processes after the time of deposition of the sands as well as detrital. Therefore, the determination of dispersed shale conductivity has been 'problematic' and use of improper values of Cwb has predominated, i.e., the 'Cyberlook method'. By demonstrating that equivalent values of Cwb and Qv result in the same water saturation, a unified petrophysical model results from what were once believed to be 'incompatible'. If B•Qv is used in a WS saturation analysis, the equivalent Cwb can be calculated and plotted, showing the variation in Cwb as a function of both clay bound water volume and conductivity (equivalent to CEC, the cation exchange capacity). This will demonstrate that the Cwb from laminar shale is incorrect and provide further evidence that dispersed shales are of different composition. There is no longer an argument which model is correct, WS or 'dual water'. The only question is which 'dual water' model is correct. One that uses the correct dispersed shale volume and bound water conductivity, the tensor dual water model, or one that incorrectly uses the laminar shale conductivity and 'bulk' shale bound water volume, the 'Cyberlook™' or MIRAIN™ model, which cannot possibly describe the laminar sand fraction properties correctly. The tensor petrophysical model can be used to correctly apply this new 'dual water' theory because it correctly partitions the laminar and dispersed shale volumes and correctly determines the dispersed shale conductivity based on the measured and accepted industry methodologies of WS, HSK, and Juhasz.

Since the present invention is a theoretically correct 'substitution of terms' for the WS equation, the clay conductivity corrected electrical parameters 'a*', 'm*', 'n*' are correct and are not changed. Again, it must be stressed that only the sand fraction, corrected for laminar shale conductivity and porosity effects, can be used to determine these parameters. Therefore, CEC determined from crushed samples using the 'wet chemistry' titration methods cannot be correctly used with this model and is incorrect. CEC must be determined from Co-Cw or membrane potential methods.

DETAILED DESCRIPTION OF THE INVENTION

Figures 2, 2A:
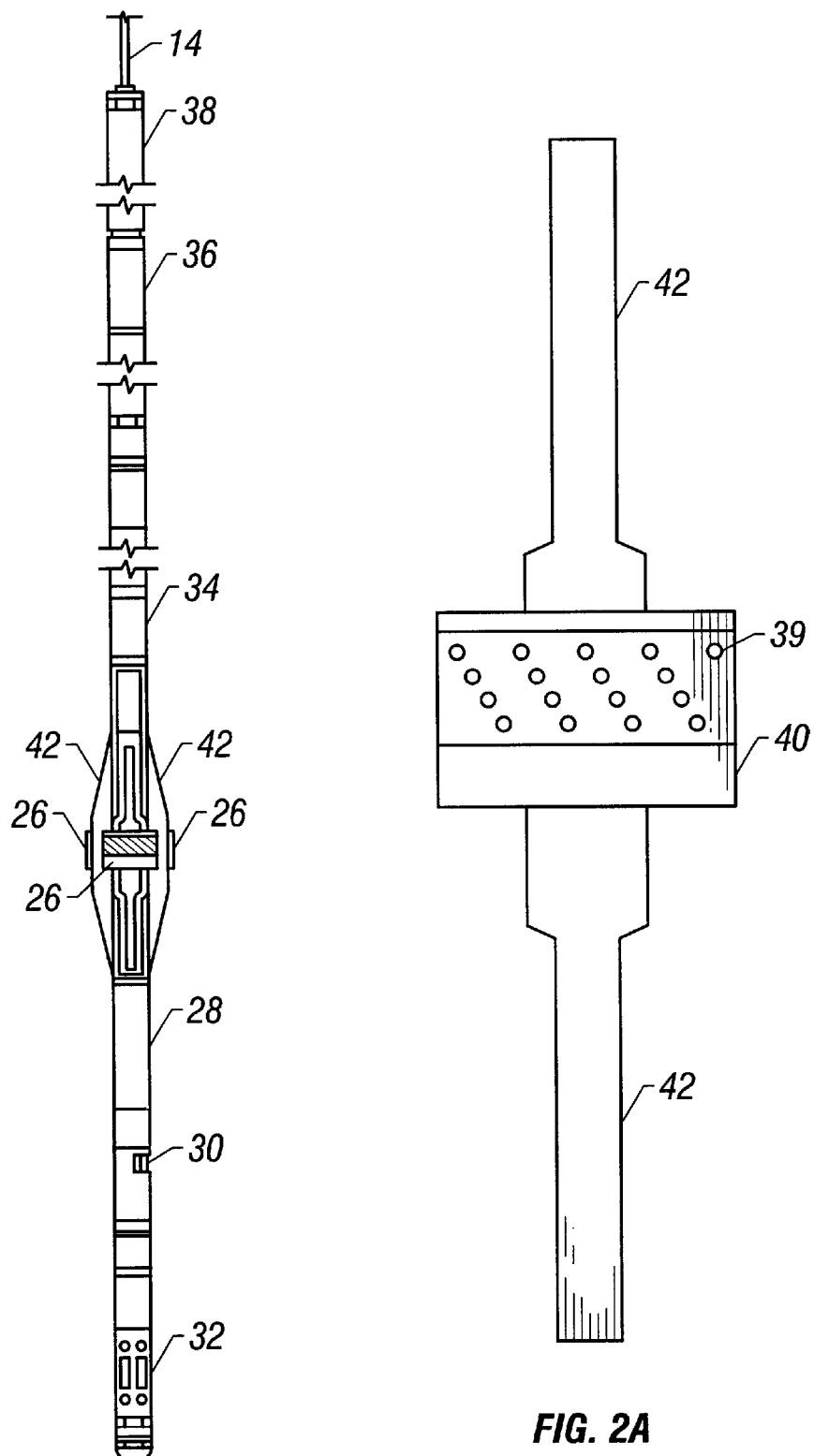
FIG. 2 (PRIOR ART) is a mechanical schematic view of the imaging tool of FIG. 1.
FIG. 2A (PRIOR ART) is a detail view of an electrode pad for the tool of FIGS. 1, 2.
Figure 3:
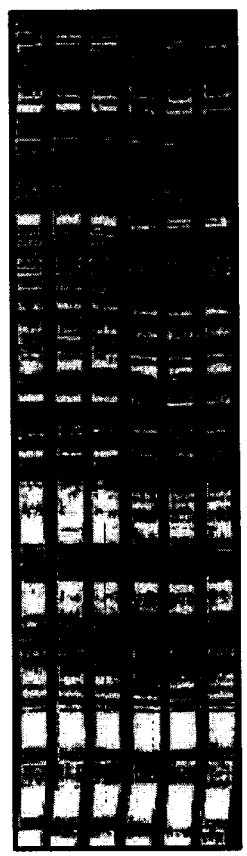
FIG. 3 (PRIOR ART) is a pictorial view of a composite imaging log obtained by merging the resistivity image data shown in acoustic image data.
Figure 4:
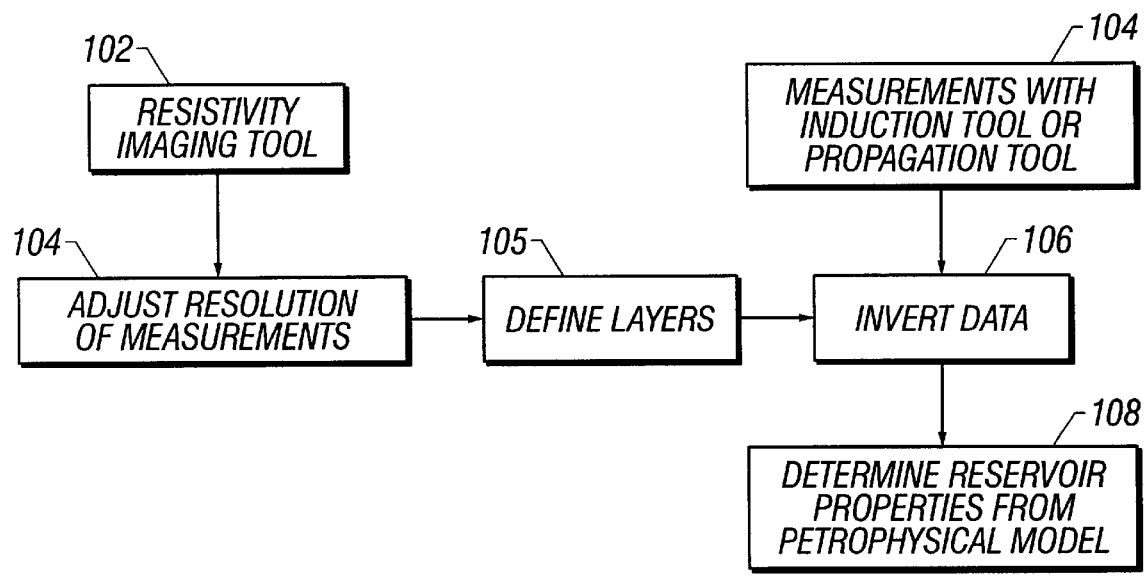
FIG. 4 is a flow chart illustrating the principal steps of the process of one embodiment of the invention.

The present invention is best understood by referring to FIGS. 1–8. FIG. 4 is a schematic flowchart of the major steps of the process used in the present invention.

Referring now to FIG. 4, one optional embodiment of the invention starts with data acquired by a borehole resistivity imaging tool 102 such as is described in U.S. Pat. No. 5,502,686 issued to Dory et al., and the contents of which are fully incorporated here by reference. It should be noted that the Dory patent is an example of a device that can be used for obtaining measurements borehole resistivity measurements: any other suitable device could also be used.

Figure 1:
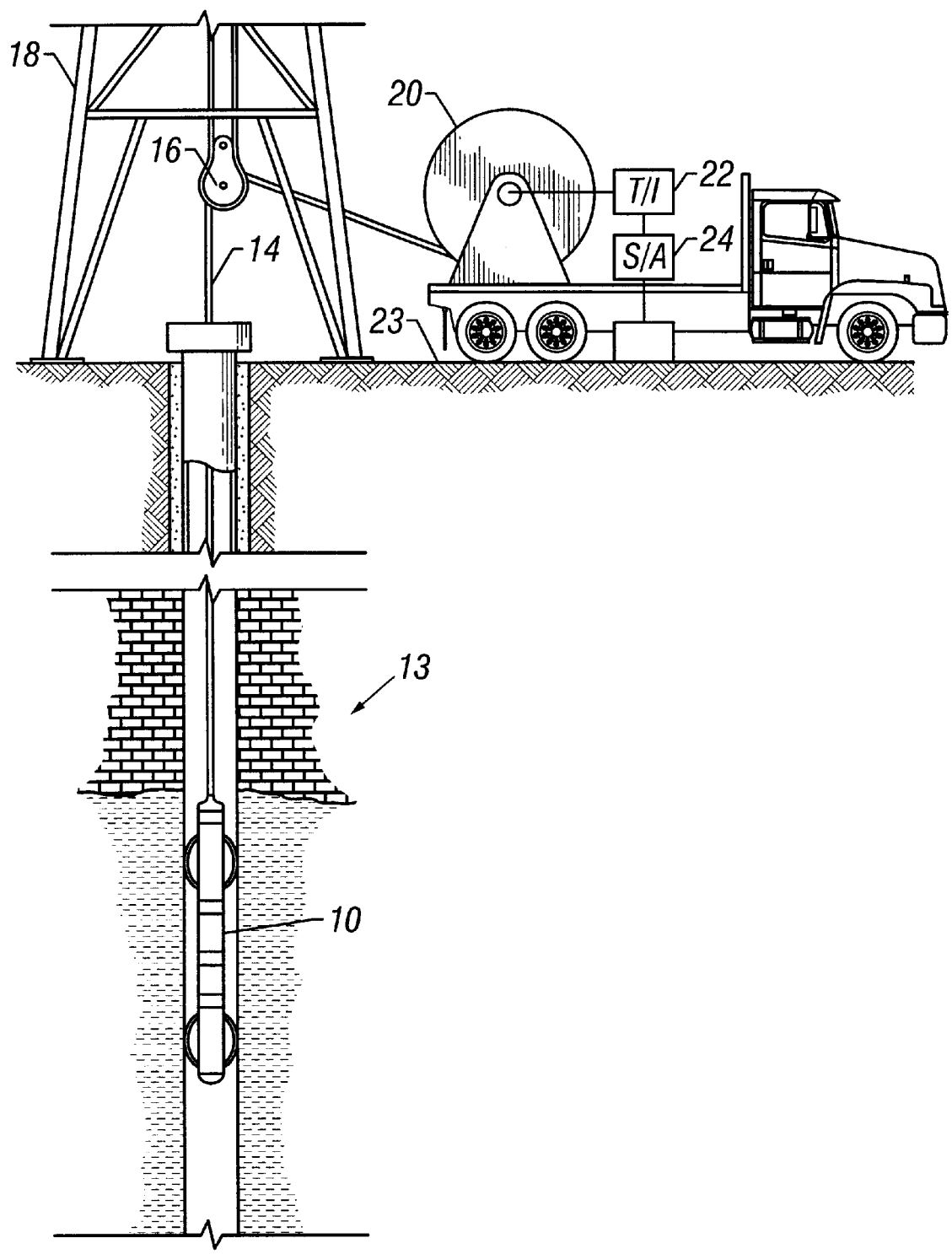
FIG. 1 (PRIOR ART) shows a resistivity imaging tool suspended in a borehole.

FIG. 1 shows a composite imaging tool 10 suspended in a borehole 12, that penetrates earth formations such as 13, from a suitable cable 14 that passes over a sheave 16 mounted on drilling rig 18. By industry standard, the cable 14 includes a stress member and seven conductors for transmitting commands to the tool and for receiving data back from the tool as well as power for the tool. The tool 10 is raised and lowered by draw works 20. Electronic module 22, on the surface 23, transmits the required operating commands downhole and in return, receives digital data back which may be recorded on an archival storage medium of any desired type for concurrent or later processing. A data processor 24, such as a suitable computer, may be provided for performing data analysis in the field in real time or the recorded data may be sent to a processing center or both for post processing of the data.

FIG. 2 is a schematic external view of the unified borehole sidewall imager system. This may be used to provide the data that may be used in an optional embodiment of the invention. The tool 10 comprising the imager system includes four important components: 1) resistivity arrays 26; 2) electronics modules 28 and 38; 3) a mud cell 30; and 4) a circumferential acoustic televiewer 32. All of the components are mounted on a mandrel 34 in a conventional well-known manner. The outer diameter of the assembly is about 5.4 inches and about five feet long. An orientation module 36 including a magnetometer and an inertial guidance system is mounted above the imaging assemblies 26 and 32. The upper portion 38 of the tool 10 contains a telemetry module for sampling, digitizing and transmission of the data samples from the various components uphole to surface electronics 22 in a conventional manner. Preferably the acoustic data are digitized although in an alternate arrangement, the data may be retained in analog form for transmission to the surface where it is later digitized by surface electronics 22.

Also shown in FIG. 2 are three resistivity arrays 26 (a fourth array is hidden in this view). Referring to FIGS. 2 and 2A, each array includes 32 electrodes or buttons identified as 39 that are mounted on a pad such as 40 in four rows of eight electrodes each. Because of design considerations, the respective rows preferably are staggered as shown, to improve the spatial resolution. For reasons of clarity, less than eight buttons are shown in FIG. 2A. For a 5.375' diameter assembly, each pad can be no more than about 4.0 inches wide. The pads are secured to extendable arms such as 42. Hydraulic or spring-loaded caliper-arm actuators (not shown) of any well-known type extend the pads and their electrodes against the borehole sidewall for resistivity measurements. In addition, the extendable caliper arms 42 provide the actual measurement of the borehole diameter as is well known in the art. Using time-division multiplexing, the voltage drop and current flow is measured between a common electrode on the tool and the respective electrodes on each array to furnish a measure of the resistivity of the sidewall (or its inverse, conductivity) as a function of azimuth.

The acoustic imager that forms the circumferential borehole imaging system 32 provides 360° sampling of the sidewall acoustic reflectivity data from which a continuous acoustic imaging log or sonogram can be constructed to provide a display of the imaged data.

The borehole resistivity imaging tool arrays necessarily allow sampling only across preselected angular segments of the borehole sidewall. From those data, a resistivity imaging log, consisting of data strips, one strip per array, separated by gaps, can be constructed and displayed. The angular width of each data-scan strip is equal to $2 \sin^{-1}\{S/(2R)\}$, where S is the array width and R is the borehole radius. The common data from the two imagers are merged together in a data processing operation to provide a substantially seamless display as shown in FIG. 3. The merging incorporates equalizing the dynamic range of the resistivity measurements with respect to the acoustic measurements. That balance is essential in order that the continuity of a displayed textural feature is not distorted when scanning across a resistivity segment of the display, between adjacent acoustic segments.

The display in FIG. 3 incorporates measurements from directional sensors to align the resistivity measurements with geographical coordinates (North, East, South, West), with the resistivity image being "unfolded" to provide a flat image of the cylindrical surface of the borehole. Those versed in the art would recognize that when a plane intersects a circular cylinder at an angle, the unrolled image of the plane would appears as a sinusoid. The display in FIG. 3 shows many such sinusoids, some corresponding to bedding planes and others corresponding to fractures. The dip angle and the dip direction corresponding to the various sinusoids are determined in the present invention using known methods. When these data are combined with measurements from other logs, such as a gamma ray or a neutron log, discrete layers of different lithologies may be identified. In particular, over a gross interval of the order of several meters or so, the fractional volume of laminated shale present in a laminated reservoir may be determined.

With flat dips, the sinusoids have essentially zero amplitude. In one aspect of the present invention, the resistivity measurements are averaged circumferentially and vertically within each identified layer to give an average resistivity measurement for each layer identified above. Once this is done, the subsurface may be characterized by a number of plane layers, each of which has a constant resistivity. With the resolution of the button-electrode tool, these layers may range in thickness from a few millimeters to a few centimeters.

Those versed in the art would recognize that when the bed boundaries are dipping, then the currents into the electrodes, particularly those in the dip direction, on the pads may not be confined to a single layer and hence not represent the resistivity of the layer at the borehole. In one aspect of the invention, the averaging described above is limited to electrodes in the strike direction: these measurements would be more likely representative of the true formation resistivity at the depth of measurement.

The resistivity measurements obtained by the averaging process correspond to layers that are beyond the resolution of electromagnetic induction logging tools or propagation resistivity tools. Accordingly, the resistivity measurements obtained at this point are averaged to give resistivities on a scale that would be measurable by an induction logging tool. This is depicted by 104 in FIG. 5.

As would be known to those versed in the art, a finely laminated sequence of layers having different resistivities exhibits a transverse isotropy on a larger scale where the wavelength of the electromagnetic wave is much greater than the layer thickness. This condition is easily satisfied even for propagation resistivity tools that, e.g., operate at a frequency of 2 MHz (with a wavelength $\lambda \approx 6$ meters); for induction logging tools that have frequencies of the order of 50 kHz to 200 kHz, the wavelengths are even longer. For such interrogating frequencies, the layered medium is characterized by a horizontal resistivity $R_h^*$ and a vertical resistivity $R_v^*$ given by:

$$R_v^* = \frac{1}{W} \sum_{W_i} R_i \Delta h \qquad (3)$$

and $$(R_h^*)^{-1} = \frac{1}{W} \sum_{W_i} \frac{\Delta h}{R_i} \qquad (4)$$

where $W_i$ is a window used to average the resistivities, $\Delta h$ is the depth sampling interval of the electrodes, and $R_i$ is the measured resistivity for a given depth.

In this invention, the terms "horizontal" and "vertical" are to be understood in terms of reference to the bedding planes and the anisotropy axes of the subsurface formations, i.e., "horizontal" refers to parallel to the bedding plane, and "vertical" refers to vertical to the bedding plane. Where the beds of the formation are dipping, the anisotropy axis is taken to be the normal to the bedding plane. When the borehole is inclined to the bedding plane, data from the orientation module 36 in FIG. 1, may be used to correct the resistivity measurements made by the resistivity imaging tool to give measurements parallel to and perpendicular to the bedding planes.

Those versed in the art would recognize that the resistivity measurements made by the electrode-pad system described above may be in error and, in particular, may need to have a scaling factor applied to the data. When this data is acquired, it may be calibrated by relating the values given by equations (3) and (4) to data from an induction logging tool or a propagation resistivity tool.

Referring again to FIG. 5, an induction or wave propagation tool is used to make measurements of the vertical and horizontal resistivity of the earth formations 104. For example, U.S. Pat. No. 5,781,436 to Forgang et al, the contents of which are fully incorporated here by reference, discloses a method an apparatus for making measurements of horizontal and vertical resistivities of a transversely isotropic formation.

The method disclosed by Forgang et al comprises selectively passing an alternating current through transmitter coils inserted into the wellbore. Each of the transmitter coils has a magnetic moment direction different from the magnetic moment direction of the other ones of the transmitter coils. The alternating current includes a first and a second frequency. The amplitude at the first frequency has a predetermined relationship to the amplitude at the second frequency. The relationship corresponds to the first and the second frequencies. The method includes selectively receiving voltages induced in a receiver coil having a sensitive direction substantially parallel to the axis of the corresponding transmitter coil through which the alternating current is passed. A difference in magnitudes between a component of the received voltage at the first frequency and a component of the voltage at the second frequency is measured, and conductivity is calculated from the difference in magnitudes of the components of the received voltage at the two frequencies. The Forgang patent is cited only by way of example of an induction device for obtaining horizontal and vertical resistivities of a formation and there are other teachings on obtaining these properties of subterranean formation.

An example of a propagation resistivity tool for making measurements of horizontal and vertical resistivities is described by Rosthal (U.S. Pat. No. 5,329,448) discloses a method for determining the horizontal and vertical conductivities from a propagation logging device. The method assumes that θ, the angle between the borehole axis and the normal to the bedding plane, is known. Conductivity estimates are obtained by two methods. The first method measures the attenuation of the amplitude of the received signal between two receivers and derives a first estimate of conductivity from this attenuation. The second method measures the phase difference between the received signals at two receivers and derives a second estimate of conductivity from this phase shift. Two estimates are used to give the starting estimate of a conductivity model and based on this model, an attenuation and a phase shift for the two receivers are calculated. An iterative scheme is then used to update the initial conductivity model until a good match is obtained between the model output and the actual measured attenuation and phase shift.

The horizontal and vertical resistivities obtained at 104 are then inverted to give a layered model of resistivities 106. U.S. Pat. No. 5,854,991 issued to Gupta et al, the contents of which are fully incorporated here by reference, discloses such a method for inversion of transverse electromagnetic induction well logging measurements. Co-pending U.S. patent application Ser. No: 09/052,462 having the same assignee as the present application, and the contents of which are fully incorporated herein by reference, discloses a method of inversion of data from propagation resistivity tools. The '462 application also discloses an ambiguity in the inversion of the resistivity measurements and a method for dealing with the ambiguity.

In the inversion method used by Gupta et al, model is generated of the axial distribution of the horizontal and vertical conductivities, from induction signals acquired by the instrument using two-frequency alternating current. The model is generated by calculating an initial estimate of the conductivity distribution and axially inverting the estimate with respect to the measurements made using the two-frequency alternating current. Shoulder correction is applied to measurements made by the instrument using single-frequency alternating current. An estimate of the radial distribution of the conductivities is generated from the shoulder corrected induction signals acquired using the single-frequency alternating current. A 2-dimensional model is made of the conductivity distribution from the model of axial distribution and from the estimate of radial distribution. In one embodiment of the present invention, the initial model for the inversion is based at least in part on data acquired by the resistivity imaging tool 105. In particular, while the resistivity imaging tool may need to be normalized and adjusted in some way to correct its resistivity dip and azimuth measurements, the layer boundaries determined by the resistivity imaging tool serve as a good starting point for the layers and resistivities used in the inversion of the transverse induction logging tool data. In another embodiment of the invention, the initial layers for the model may be determined from other high resolution logging tools, such as a Laterolog™, a microresistivity log, a density device having pads thereon, or a gamma ray logging too.

The two-frequency induction signals are corrected for near wellbore effects using two-frequency whole space responses calculated using the 2-dimensional model. The corrected two-frequency signals are then axially inverted to generate a 2-dimensional model. Using the corrected two-frequency signals in place of the acquired signals, all the previous steps are repeated until differences between the corrected two-frequency induction signals from successive repetitions (iterations) of the steps fall below a predetermined threshold. The two-dimensional model extant when process is halted becomes the final two-dimensional model.

Once the inversion is performed, the horizontal and vertical resistivities obtained therefrom are analyzed using a petrophysical model 108. In one embodiment of the invention, the values of vertical and horizontal resistivity thus obtained are related to the fluid content and fractional volume of pore spaces in subsurface layers by expressions such as the following derived from the Patchett-Herrick water saturation model for shaly sand formations:

$$\frac{1}{R_{t_{horiz}}} = (1 - V_{sh})\left[\frac{BQ_vS_w}{F^*_{horiz}} + \frac{S_{w_t}^{n^*}}{F^*_{horiz}R_w}\right] + \frac{V_{sh}}{R_{sh}} \tag{5}$$

gives the horizontal resistivity in the reservoir-rock (non-shale) layers of the formation. $F^*_{sd,h}$ in equation (5) represents the formation resistivity factor for the horizontal resistivity, and $B \cdot Q_v$ is a factor related to the resistivity of "dispersed" shale (shale located within the pore spaces of the reservoir rock). $V_{sh}$ represents the fractional volume within the earth formation of interest of the layers of shale ("laminated shale volume"). The other terms represent the same quantities as described in the Background section herein. See for example, J. G. Patchett et al, "Introduction Section III. Model Evaluation", SPWLA Shaly Sand Reprint Volume, Society of Professional Well Log Analysts, Houston, Tex. (1982) and M. H. Waxman et al, "Electrical Conductivities in Oil Bearing Shaly Sands", SPE Journal, vol. 8, no. 2, pp. 107–122, Society of Petroleum Engineers, Richardson Tex., (1968). The porosity can be determined by any one of a number of well known measurements, such as acoustic travel time, neutron porosity, bulk density, or combinations of measurements such as these as is well known in the art. The porosity measurements just described are meant only as examples of measurements used to determine the porosity and are not meant to limit the invention in any way.

Similarly, for the vertical resistivity, $Rt_{ver}$, an expression relating the vertical resistivity to the water saturation $S_w$ is:

$$R_{t_{ver}} = (1 - V_{sh})\left[\frac{BQ_vS_w}{F^*_{ver}} + \frac{S_{w_t}^{n^*}}{F^*_{ver}R_w}\right]^{-1} + V_{sh}R_{sh} \tag{6}$$

Note that equation (5) is written in a form relating to conductivity (inverse of resistivity) rather than in a form related to resistivity because as is known in the art, the signal measured by an induction logging instrument, where eddy currents are induced substantially along layer perpendicular to the wellbore, is related in magnitude to the sum of the conductivities of the individual layers. Conceptually this can be thought of as current passing through a set of resistors connected in parallel. Conversely, equation (6) is expressed in terms of resistivity, because where eddy currents are induced in a direction perpendicular to the layers, the effect of layering on the magnitude of the induction signal is similar to passing electrical current through a set of resistors connected in series. These effects of laminated shale/reservoir rock on the measurements of resistivity is described for example, in J. D. Klein et al, "The Petrophysics of Electrically Anisotropic Reservoirs", The Log Analyst, May–June 1997, Society of Professional Well Log Analysts, Houston, Tex.

In one embodiment of the invention, it has been determined that whatever the values of resistivity in the "horizontal" and "vertical" directions, the water saturation, $S_w$, must be equal whether determined from the vertical or horizontal resistivity measurements. A set of relationships can be developed, where a simplifying variable $A_w$ can be defined as:

$$A_w = \frac{S_w^n + BQ_v S_w R_w}{R_w} \quad (7)$$

and these expressions in terms of conductivity in the reservoir (non shale) layers, $C_t$, are:

$$C_{t_{hor}} = (1 - V_{sh})\frac{A_w}{F_{hor}} + V_{sh} C_{ch_{hor}} \quad (8)$$

$$C_{t_{ver}}^{-1} = (1 - V_{sh})\frac{F_{ver}}{A_w} + V_{sh} C_{sh_{ver}}^{-1} \quad (9)$$

$$C_{sh_{hor}} = \lambda_{sh} \left[ \frac{1}{C_{t_{ver}} V_{sh}} - \frac{(1 - V_{sh})F_{ver}}{A_w V_{sh}} \right]^{-1} \quad (8)$$

where $\lambda_{sh}$ represents an "anisotropy factor" relating the vertical and horizontal conductivities (or resistivities) in the same formation.

The expressions in equations (8) and (9) can be rearranged into a second order polynomial expression of $A_w$:

$$A_w^2 \frac{1 - V_{sh}}{F_{hor} C_{t_{ver}}} - A_w \left[ \frac{C_{t_{hor}}}{C_{t_{ver}}} + (1 - V_{sh})^2 \frac{F_{ver}}{F_{hor}} - V_{sh}^2 \lambda_{sh} \right] + [(1 - V_{sh})C_{t_{ver}} F_{ver}] = 0 \quad (11)$$

where it should be noted, significantly, that the value of conductivity (or resistivity) of the shale, $C_{sh}$, is absent. Equation (9) can be readily solved for $S_w$ to provide a calculation of the water saturation (and its complement, the hydrocarbon saturation) in the non-shale layers which does not require explicit determination of the resistivity (or conductivity) of the shale layers in the reservoir earth formation of interest. The $C_t$ terms in equation (9) represent total conductivity (electrical conductivity of both the shale and reservoir rock portions of the earth formation of interest).

Figure 5:
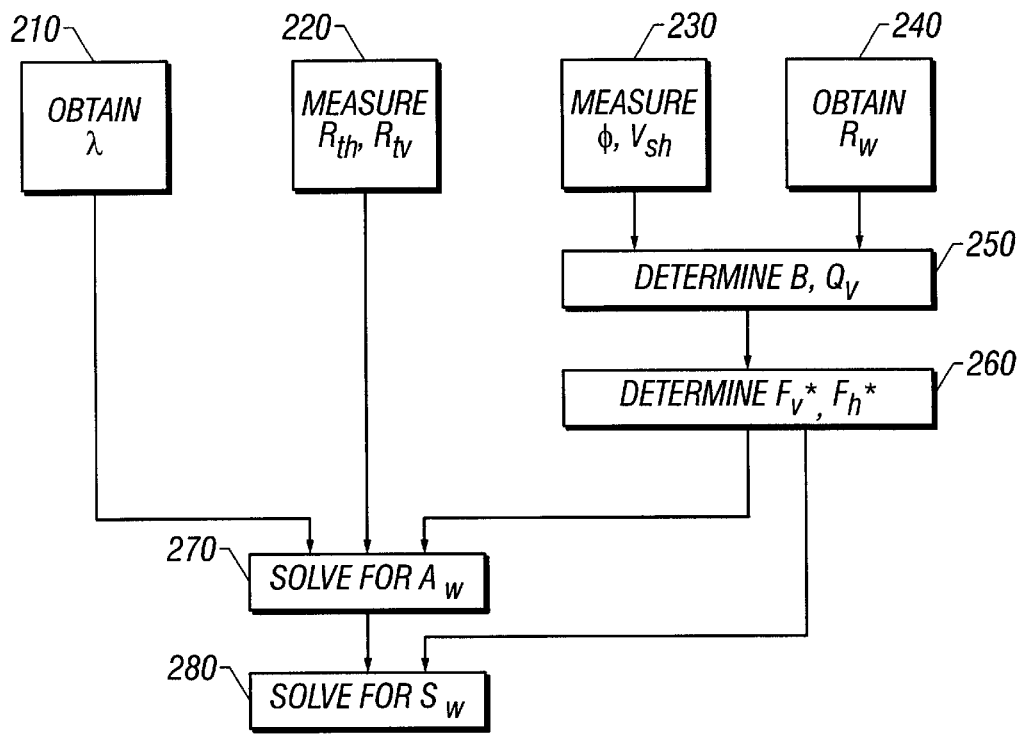
FIG. 5 gives the steps of one subprocess of an embodiment of the invention for determination of water saturation from measured values of vertical an horizontal resistivities.

Turning now to FIG. 5, a flow chart of the subprocess for determination of water saturation according to one embodiment of the invention using the Patchett-Herrick model is depicted. Using a logging tool such as disclosed in the '436 patent measurements are made within a borehole. The logging tool makes measurements of induction signals along and perpendicular to the axis of the instrument as well as cross-component signals. As described above, these measurements are processed to give a "horizontal" and "vertical" resistivity 220 at each depth in the borehole. A measurement of the connate water resistivity $R_w$ is obtained 240. Using the value of $R_w$ and a measured value 230 of porosity $\phi$ and $V_{sh}$, the quantities B and $Q_v$ are determined 250 using a relationship given by Juhasz. These, together with the values of $\phi$ enable the determination of $F^+_{horz}$ and $F^*_{vert}$ using the Waxman-Smit and Patcher-Herrick equations. These are substituted in equation (9) along with the measured values of $R_{tvert}$ and $R_{thorz}$ and an assumed shale anisotropy factor $\lambda_{sh}$ 210 and solved to give the value of $A_w$ 270. By substituting this value of $A_w$ in equation (5) along with values for B, $Q_v$ and $R_w$, the water saturation $S_w$ is obtained 280.

Other embodiments of the invention use orthogonal tensor models based on electrical anisotropy ($R_v/R_h$) instead of one based on single scalar parallel conductivity models. The first tensor model is easily implemented for isotropic and anisotropic shales with isotropic sands. For the solution of anisotropic sand and shale, the laminar shale volume must be determined from some external model such as Thomas-Stieber or image log data. True laminar sand porosity must also be derived from the Thomas-Stieber (1975) model and is essential to true laminar reservoir characterization. The tensor model uses the Waxman-Smits equation to evaluate the laminar sand component and utilizes the Hill, Shirley, and Klein (1979) equation to derive $Q_v$ from the dispersed clay bound water fraction. The final result of this two-step resistivity tensor model is consistent with the scalar model originally proposed by Patchett and Herrick. However, it should be noted that, in this model the laminar sand resistivity component is derived directly from the tensor model and is implicitly linked to the correct laminar shale volume.

Figure 6:
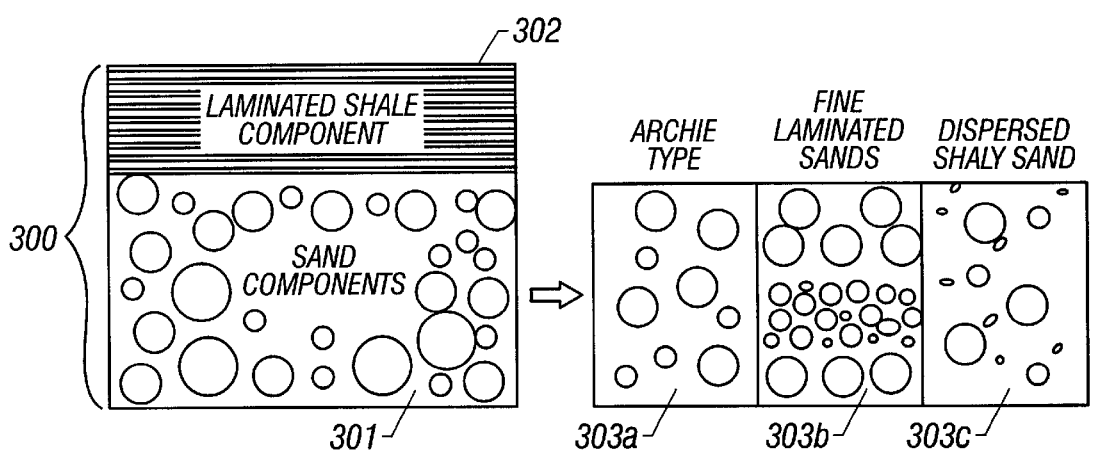
FIG. 6 is a schematic illustration of the components of the tensor petrophysical model of the present invention.
Figure 7:
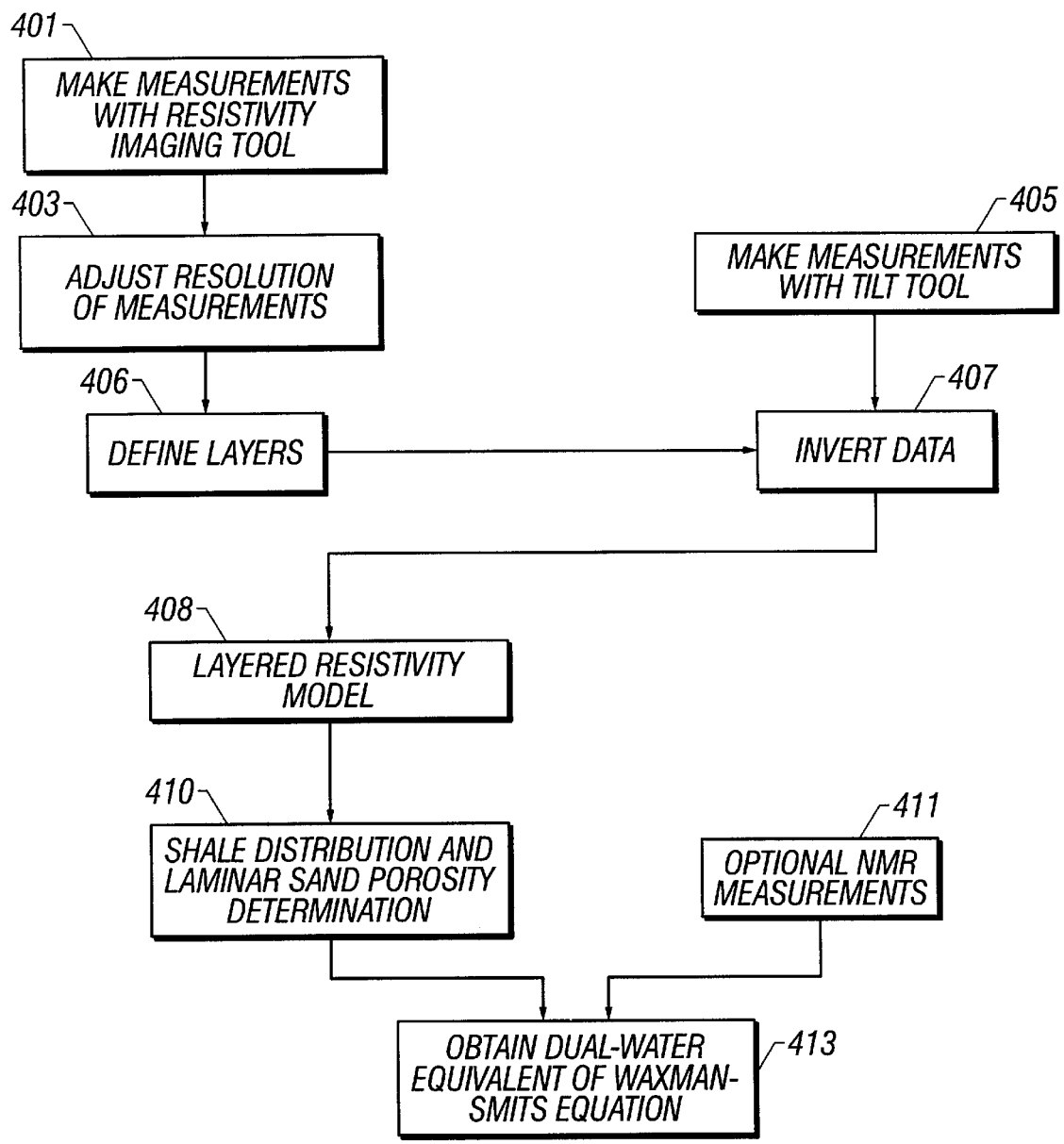
FIG. 7 is a flow chart of the steps of a second embodiment of the invention.

FIG. 6 illustrates a laminated formation 300 comprising interbedded sand 301 and shale layers 302. For illustrative purposes, only a single sand and a single shale layer are shown for representing the overall makeup of the formation. The sand may further comprise a clean Archie type sand 303a having poor sorting (i.e., different grain sizes), a fine laminated sand 303b that includes laminae of well sorted sand with differences in grain size between the individual laminae, and a dispersed shaly sand 303c having shale dispersed therein.

Electrical anisotropy is the direct, measurable result of the laminar shale volume and conductivity or variable water saturation within the sand (as established by prior investigators). In the case of thinly laminated reservoirs, the first tensor model is volumetrically correct and provides a more accurate description of the laminar sand component by directly determining conductivities in both horizontal and vertical directions.

THE FIRST TENSOR MODEL

The first tensor model used herein focuses primarily on the determination of laminar sand properties and hydrocarbon saturation calculation of the interbedded sand layers. The presence of hydrocarbons in shales, (source rocks) that could result in anisotropy, is not considered and no distinction is made between clay-bound water and free water. The model assumes macroscopic anisotropy because the dimension of laminae is less than the vertical resolution of the measurement. Intrinsic anisotropy within the individual sand laminae is also considered in a general case. The first tensor model is two dimensional and only 'vertical' anisotropy is considered. Laminae or beds are assumed to be horizontally or 'laterally' isotropic.

The first tensor model is implemented in a two-step process. The first step of analysis permits the decoupling of the determination of laminar shale volume, laminae resistivities, and laminar sand properties including porosity, dispersed clay volume, Qv, etc. The determination of saturation is made in a second step in order to allow the application of different sets of assumptions or models to the data The initial step of the analysis is a simple, laminated sand-shale calculation of the fractional laminar shale volume $V_{sh-l}$, and the fractional laminar sand volume expressed as $N/G=1-V_{sh-l}$. All laminar sand conductivities and fractional volumes are determined at this point and are used as input for the saturation calculation. The second step of the analysis calculates the laminar sand component hydrocarbon saturation. Sand properties can be described as a clean, homogeneous Archie (1942) sand or as a dispersed shaly sand using the Waxman-Smits (1968) equation. The combination of this two-step analysis results in a robust tensor model determination of laminar sand resistivity and saturation determination, from Waxman-Smits, using true sand laminar porosity as proposed by Patchett and Herrick (1982).

The following terms are used in the tensor petrophysical model:

$C_{t,h}$, $C_{t,v}$ Horizontal and vertical conductivity $\lambda = C_{t,h}/C_{t,v}$ Anisotropy ratio, horizontal and vertical conductivity $C_{sd,h}$, $C_{sd,v}$ Horizontal and vertical conductivity of the sand component $\lambda_{sd} = C_{sd,h}/C_{sd,v}$ Anisotropy ratio of the sand $C_{sh,h}$, $C_{sh,v}$ Horizontal and vertical conductivity of the shale component $V_{sh-l}$ Volume fraction of the laminated shale $1-V_{sh-l}=N/G$ Volume fraction of the sand $\chi_h = C_{sh,h}$, $C_{sd,v}$ Shale/sand conductivity ratio.

The equations for the two conductivity components in both horizontal and vertical directions are:

$$C_{t,h} = C_{sd,h}[1+V_{sh-l}(\chi_h-1)] \quad (12)$$

and $$C_{t,v} = C_{sd,h}\lambda_{sd}^{-1}\left[1 + V_{sh-l}\left(\chi_h^{-1}\frac{\lambda_{sh}}{\lambda_{sd}} - 1\right)\right]^{-1} \quad (13)$$

The sand and the shale related terms in equations (12)–(13) are separated to emphasize the main components of interest.

The macroscopic anisotropy ratio is $$\lambda = \lambda_{sd}\left[1 + V_{sh-l}B - V_{sh-l}^2\left(1 + B - \frac{\lambda_{sh}}{\lambda_{sd}}\right)\right] \quad (14)$$

with $$B = \chi_h + \chi_h^{-1}\frac{\lambda_{sh}}{\lambda_{sd}} - 2 \quad (15)$$

The forward modeling is derived from normalized parameters by the defined dimensionless anisotropy ratio parameters: $\lambda$, $\lambda_{sd}$, $\lambda_{sh}$ The sand normalized conductivities are:

$$\frac{C_{t,h}}{C_{sd,v}} = 1 + V_{sh-l}\left(\frac{C_{sh,h}}{C_{sd,v}} - 1\right) \quad (16)$$

$$\frac{C_{t,h}}{C_{sd,v}} = 1 + V_{sh-l}\left(\frac{C_{sd,h}}{C_{sh,v}} - 1\right)^{-1} \quad (17)$$

and the normalized anisotropy ratio is $$\frac{\lambda}{\lambda_{sd}} = 1 + V_{sh-l}B - V_{sh-l}^2\left(1 + B - \frac{\lambda_{sh}}{\lambda_{sd}}\right) \quad (18)$$

Laminar Shale Volume and Sand Conductivity

As noted above, the first step in using the tensor petrophysical model is the determination of laminar shale volume and sand conductivity from the measured anisotropy data and total conductivity in the horizontal and vertical directions, $C_{t,h}$ and $C_{t,v}$. The sand and shale conductivities in both horizontal and vertical directions ($C_{sd,h}$, $C_{sd,v}$, $C_{sh,h}$, and $C_{sh,v}$) are calculated from these data. Additionally, the volumetric sand and shale parameters, i.e., $V_{sh}$ and N/G, must be derived. Depending upon the available data and any additional information about the sand and shale properties, three cases are considered.

Case A

Shale and sand are both anisotropic. To derive the sand conductivities in both the horizontal and vertical directions ($C_{sd,h}$, $C_{sd,v}$) from the composite formation conductivities, $C_{t,h}$ and $C_{t,v}$, the two shale conductivities ($C_{sh,h}$ and $C_{sh,v}$) are determined from log data in a representative shale interval and the laminated shale content $V_{sh-l}$ from additional input such as Thomas-Stieber. Given these additional formation parameters, the sand conductivities can be calculated $$C_{sd,v} = C_{t,v}\frac{(1-V_{sh-l})C_{sh,v}}{C_{sh,v} - V_{sh-l}C_{t,v}} = \frac{C_{t,v}(1-V_{sh-l})}{1 - V_{sh-l}\frac{C_{t,v}}{C_{sh,v}}} \quad (19)$$

and $$C_{sd,h} = \frac{C_{t,h} - V_{sh-l}C_{sh,h}}{1 - V_{sh-l}} \quad (20)$$

CASE B

Shale is anisotropic and the sand is isotropic. The sand conductivity $C_{sd}$ and the laminated shale content $V_{sh-l}$ can be calculated from the composite formation conductivities, $C_{t,h}$ and $C_{t,v}$, given the two shale conductivities, $C_{sh,h}$ and $C_{sh,v}$:

$$C_{sd} = \frac{1}{2}\{(C_{sd}^a + C_{sh,h}) \pm [(C_{sh,h} - C_{sd}^a)^2(1+\Delta C)]^{1/2}\} \quad (21)$$

where $$C_{sd}^a = C_{t,v}\frac{C_{sh,h} - C_{t,h}}{C_{sh,v} - C_{t,v}} \quad (22)$$

and $$\Delta C = 4C_{sd}^{iso}\frac{C_{sh,h} - C_{sh,v}}{(C_{sd}^{iso} - C_{sh,h})^2} \quad (23)$$

In equation (21), the +sign is taken if $C_{sd} < C_{sh,v}$ and the — sign is taken if $C_{sd} > C_{sh,v}$. $C_{sd}^a$ is defined as "apparent sand conductivity." If the shale is isotropic, $C_{sh,h} = C_{sh,v}$, then this conductivity is identical to the true sand conductivity. The term $\Delta C$ is the correction for anisotropic shale. For isotropic shale where $C_{sh,h} = C_{sh,v}$, $\Delta C$ becomes zero. The laminar shale content can be calculated using $$V_{sh-l} = \frac{C_{t,h} - C_{sd}}{C_{sh,h} - C_{sd}} \quad (24)$$

or $$V_{sh-l} = \frac{C_{sh,v}}{C_{t,v}}\frac{C_{t,v} - C_{sd}}{C_{sh,v} - C_{sd}} \quad (25)$$

CASE C

Both the sand and shale are isotropic. In this case, two solutions are possible, depending upon which a priori information is available. In the first solution, the shale conductivity $C_{sh}$ is assumed while in the second solution, the laminated shale volume $V_{sh-l}$ is determined from an independent source such as Thomas Stieber model or the resistivity image data. The laminated shale content is calculated from equation (24) while the sand conductivity is obtained from $$C_{sd} = C_{t,v} \frac{C_{sh} - C_{t,h}}{C_{sh} - C_{t,v}} \quad (26)$$

The sand and shale conductivities are calculated from the input laminar shale volume from the following equations:

$$C_{sd} = \frac{C_{t,h} + C_{t,v}(1 - 2V_{sh-l})}{2(1 - V_{sh-l})} \pm \left\{ \left[ \frac{C_{t,h} + C_{t,v}(1 - 2V_{sh-l})}{2(1 - V_{sh-l})} \right]^2 - C_{t,v} C_{t,h} \right\}^{1/2} \quad (27)$$

and $$C_{sh} = V_{sh-l} [C_{t,v}^{-1} - (1 - V_{sh-l}) C_{sd}^{-1}]^{-1} \quad (28)$$

The second step in the application of the tensor model is the analysis of the laminar sand reservoir component. Water saturation of the laminar sand is a function of the 'true' laminar sand porosity, electrical properties, and laminar sand conductivity and can be calculated using various published relationships or other models such as effective medium or electrical efficiency. In this model, the Waxman-Smits equation is applied to quantitatively correct for dispersed clay conductivity in the sand. This equation reduces to Archie's equation when dispersed clay is not present.

The intrinsic electrical properties of the anisotropic sand component, formation factor (m*) and saturation exponent (n*), are a function of the measurement direction and resulting saturation profiles. The saturation exponent is not constant over the full range of water saturation. Waxman-Smits equations for the horizontal and vertical direction are:

$$Swt_{sd}^{n^*,v} = \left[ \frac{a^* \cdot R_w}{\phi_{T,sd}^{m^*,v} \cdot (1 + Rw \cdot B \cdot Qv_{disp,sd} \cdot Swt_{sd}^{-1}) \cdot Rt_{v,sd}} \right] \quad (29)$$

$$Swt_{sd}^{n^*,h} = \left[ \frac{a^* \cdot R_w}{\phi_{T,sd}^{m^*,h} \cdot (1 + Rw \cdot B \cdot Qv_{disp,sd} \cdot Swt_{sd}^{-1}) \cdot Rt_{h,sd}} \right] \quad (30)$$

This assumes that the water saturations of different sand laminae vary or that the volumes of sand comprise two different saturations. In a preferred embodiment of the invention, saturations and relative sand volumes are assumed constant and the vertical and horizontal cementation and saturation exponent are assumed constant. The water saturation for an isotropic sand is:

$$Swt_{sd}^8 = \left[ \frac{a^* \cdot R_w}{\phi_{T,sd}^{m^*} \cdot (1 + Rw \cdot B \cdot Qv_{disp,sd} \cdot Swt_{sd}^{-1}) \cdot Rt_{sd}} \right] \quad (31)$$

$Q_v$ ($Qv_{disp,sd}$) of the laminar sand fraction can be determined from the Hill, Shirley, Klein (1979) equation or the Juhasz (1986) equation shown here where $C_o$ is NaCl concentration of the formation water in g/l or kppm.

$$Swb_{disp,sd} = \frac{\phi_{CBW-disp,sd}}{\phi_{T,sd}} \quad (32)$$

$$Qv_{disp,sd} = \frac{Swb_{disp,sd}}{\left[ \frac{0.6425}{C_o^{1/2}} + 0.22 \right]} \quad (33)$$

"True" laminar sand porosity can be derived from total porosity using density data from a density log or an NMR log and the methodology outlined by Thomas Stieber (1975) and demonstrated by Juhasz (1981)

$$\phi_{T,sd} = \frac{\phi_T - \phi_{sh} \cdot V_{sh,l}}{(1 - V_{sh,l})} \quad (34)$$

where $C_w$ Conductivity of the formation water
$R_w$ Inverse of $C_w$, formation water resistivity
$\phi_{Total}$ Total porosity of the formation
$\phi_{T,sd}$ Thomas-Stieber porosity of laminar sand
$Swt_{sd}$ Total water saturation of laminar sand
a*, m*, n* Clay corrected Archie parameters, anisotropic sand being noted with subscripts (h, v)
$Qv_{disp,sd}$ Cation exchange capacity per unit pore volume (meq cm$^{-3}$) of the dispersed clay
$\phi_{CBW-disp,sd}$ Porosity fraction of bound water associated with dispersed clay
B Equivalent ionic conductance of clay-exchange cations
$Swb_{disp,sd}$ Bound water saturation of the dispersed clay fraction only

DUAL-WATER TENSOR PETROPHYSICAL MODEL

The second tensor petrophysical model of the present invention includes a dual-water equivalent of the Waxman Smits equation. The determination of the dual-water equivalent is understood by reference to FIG. 7. As noted above with reference to FIG. 4, measurements are made using a microresistivity imaging tool 401. The resolution of these measurements is adjusted 403 as discussed above with reference to 104 in FIG. 4. An initial layer model is obtained 406 (similar to 105 in FIG. 4).

Measurements relating to the vertical and horizontal resistivities of the formation are made 405 using a TILT or other suitable device, as discussed above for a similar step in FIG. 4 and the data are inverted to give a layered model of resistivities of sands and shales 407, 408. One of three sets of equations may be used to obtain this layered model.

Laminar Sand and Shale Components are Both Isotropic

The laminar sand conductivity and the laminar shale volume can be determined from horizontal and vertical conductivity measurements and laminar shale conductivity by the following equations:

$$C_{sd} = C_{t_v} \cdot \frac{C_{sh} - C_{t_h}}{C_{sh} - C_{t_v}} \quad (35)$$

and $$V_{sh_{lamr-TILT}} = \frac{C_{t_h} - C_{sd}}{C_{sh} - C_{sd}} \quad (36)$$

and the dispersed shale volume is determined from an externally obtained (e.g., from a gamma ray or SP log measurement) by $$V_{sh_{disp-TILT}} = V_{sh} - sh_{lamr-TILT} \quad (37)$$

In an alternate embodiment, the isotropic sand and shale conductivities are obtained using the input laminar shale volume $V_{sh-lamr}$ from an external method or wireline long data using the equations $$C_{sd} = \frac{C_{t_h} + C_{t_v} \cdot (1 - 2 \cdot V_{sh-lamr})}{2 \cdot (1 - V_{sh-lamr})} \pm \qquad (38)$$

$$\sqrt{\left[\frac{C_{t_h} + C_{t_v} \cdot (1 - 2 \cdot V_{sh-lamr})}{2 \cdot (1 - V_{sh-lamr})}\right]^2 - C_{t_v} \cdot C_{t_h}}$$

and $$C_{sh} = V_{sh-lamr} \cdot [C_{t_v}^{-1} - (1 - V_{sh-lamr}) \cdot C_{sd}^{-1}]^{-1}. \qquad (39)$$

Laminar Shale is Anisotropic and Laminar Sand is Isotropic

Laminar sand conductivity and laminar shale volume is determined from horizontal and vertical conductivity measurements and laminar shale vertical and horizontal conductivity by $$C_{sd} = \frac{1}{2} \cdot \left\{ (C_{sd}^{iso} + C_{sh_h}) - \sqrt{(C_{sh_h} - C_{sd}^{iso})^2 \cdot (1 + \Delta C)} \right\} \qquad (40)$$

where $$C_{sd}^{iso} = C_{t_v} \cdot \frac{C_{sh_h} - C_{t_h}}{C_{sd}^{iso} - C_{t_v}} \qquad (41)$$

and $$\Delta C = 4 \cdot C_{sd}^{iso} \frac{C_{sh_h} - C_{sh}}{(C_{sd}^{iso} - C_{sh_h})^2} \quad \text{(same as eq. 23)} \qquad (42)$$

$C_{sd}^{iso}$ is defined as the "isotropic sand conductivity." If the vertical and horizontal shale conductivities are equal, then $C_{sh,h} = C_{sh,v}$, and then $C_{sd}^{iso}$ is equal to the true sand conductivity $C_{sd}$. The term $\Delta C$ is the correction for anisotropic shale. For isotropic shale where $C_{sh,h} = C_{sh,v}$, $\Delta C$ becomes zero. The laminar shale volume can be calculated from either $$V_{sh_{lamr-TILT}} = \frac{C_{t_h} - C_{sd}}{C_{sh_h} - C_{sd}} \quad \text{(same as 38)} \qquad (43)$$

$$V_{sh_{lamr-TILT}} = \frac{C_{sh_v}}{C_{t_v}} \cdot \frac{C_{t_v} - C_{sd}}{C_{sh_v} - C_{sd}} \qquad (44)$$

and the dispersed shale volume is obtained from an externally determined shale volume $V_{sh}$ and the laminar shale volume from Eq. 102 as $$V_{sh_{disp-TILT}} = V_{sh} - V_{sh_{lamr-TILT}} \qquad (45)$$

The externally determined shale volume may be obtained from an SP or gamma ray log or other suitable log.

Laminated Sand and Shale are Both Anisotropic

Determination of sand vertical and horizontal conductivity when the shale and sand are both anisotropic require knowledge of the laminated shale volume $V_{sh-lamr}$ In a preferred embodiment of the invention, this is obtained from the microresistivity tool. Alternatively, this may be obtained using the Thomas-Steiber method. The sand conductivities are then obtained as $$C_{sd_h} = \frac{C_{t_h} - V_{sh_{lamr}} \cdot C_{sh_h}}{1 - V_{sh_{lamr}}} \qquad (46)$$

and $$C_{sd_v} = C_{t_v}(1 - V_{sh_{lamr}}) \cdot \frac{C_{sh_v}}{C_{sh_v} - V_{sh_{lamr}} \cdot C_{t_v}} \qquad (47)$$

Referring again to FIG. 7, The next step is the determination of shale distribution and the laminar sand porosity 410. The laminar and dispersed shale volumes (subscripted '-TS') are obtained using the Thomas-Steiber and Juhasz relationships $$V_{sh_{lamr-TS}} = \frac{\phi_T - (\phi_{sh} - 1) \cdot V_{sh} - \phi_{max}}{(1 - \phi_{max})} \qquad (48)$$

In eq. 48, $\phi_{max}$ is the clean sand porosity with no dispersed or pore filling clays and represents the maximum "sand porosity". This quantity may be determined from log data in a clean, thick massive sand from a porosity log or extrapolated from a cross-plot of $V_{sh}$ and $\phi_T$
and $$V_{sh_{disp-TS}} = V_{sh} - V_{sh_{lamr-TS}} \qquad (49)$$

Total porosity of the laminar sand fraction is obtained either from the TILT laminar shale volume (Eq. 36) and/or the Thomas-Steiber calculated laminated shale volume by $$\phi_{T_{sd}} = \frac{\phi_T - \phi_{sh} \cdot V_{sh_{lamr-TILT}}}{(1 - V_{sh_{lamr-TILT}})} \qquad (50)$$

Similarly, the effective porosity of the laminar sand fraction is determined using either the TILT laminar shale volume (Eq. 36) or the Thomas-Steiber calculated laminar shale volume by $$\phi_{E_{sd}} = \phi_{T_{sd}} - \frac{\phi_{sh} \cdot V_{sh_{disp-TILT}}}{(1 - V_{sh_{lamr-TILT}})} \qquad (51)$$

where $V_{sh,disp-TILT}$ is obtained from eq. 49. In an optional embodiment of the invention, NMR data is used 411 in FIG. 7 in the following manner.

$$V_{sh_{CBW}} = \frac{CBW}{CBW_{sh}} \qquad (52)$$

and $$V_{sh_{lamr-NMR}} = \frac{\phi_{T_{NMR}} - (CBW_{sh} - 1)\frac{CBW}{CBW_{sh}} - \phi_{max}}{(1 - \phi_{max})} \qquad (53)$$

The laminar shale component 'bound water fraction' is determined by $$CBW_{lamr} = CBW_{sh} \cdot V_{sh_{lamr-TILT}} \qquad (54)$$

where the first term on the right hand side of the equation is obtained from a log in a shaly portion of the subsurface and the second term is obtained from eq. 36.
The dispersed shale volume can be determined using the TILT or Thoms-Steiber laminar shale volume and is defined as $$V_{sh_{disp-NMR}} = V_{sh_{CBW}} - V_{sh_{lamr-NMR}} \qquad (55)$$

or from eqs. 54 and 36 as $$V_{sh_{disp-NMR}} = V_{sh_{CBW}} - V_{sh_{lamr-TILT}} \quad (56)$$

or determined directly from the NMR CBW data by $$V_{sh_{disp-NMR}} = \frac{CBW - CBW_{lamr}}{CBS_{sh}} \quad (57)$$

The first term in the numerator of eq. 57 is obtained from an NMR log in a shaly sand, the second term in the numerator is obtained from eq. 54 and the denominator is obtained from an NMR log in 100% shale. Those versed in the art would recognize that eq. 55 is the NMR equivalent of eq. 49. The dispersed 'clay bound water' fraction is determined as $$CBW_{disp} = CBW - CBW_{lamr} \quad (58)$$

where the first term on the right hand side is obtained from an NMR log in a shaly sand and the second term is obtained from eq. 54.

The total porosity of the laminar sand fraction is determined from eqs. 36 and 54

$$\phi_{T_{sd}} = \frac{\phi_{T_{NMR}} - CBW_{lamr}}{(1 - V_{sh_{lamr}})} \quad (59)$$

The effective porosity of the laminar sand fraction is determined from eqs. 36, 57 and 58

$$\phi_{E_{sd}} = \phi_{T_{sd}} - \frac{CBW_{disp}}{(1 - V_{sh_{lamr}})} \quad (60)$$

The dispersed clay bound water fraction of the laminar sand volume is determined directly from TILT and NMR data by $$S_{wb_{disp,sd}} = \frac{CBW_{sh}(V_{sh_{NMR}} - V_{sh_{lamr-TILT}})}{\phi_{T_{NMR}} - CBW_{sh} \cdot V_{sh_{lamr-TILT}}} \quad (61)$$

which reduces to $$S_{wb_{disp,sd}} = \frac{CBW_{disp}}{\phi_{T_{NMR}} - CBW_{lamr}} \quad (62)$$

Eq. 62 gives a method for direct determination of dispersed shale bound water saturation using TILT (eq. 54) and NMR CBW data (eq. 124). Another way of writing eq. 62 in terms of the output of eqs. 59 and 60 is $$S_{wb_{disp,sd}} = \frac{\phi_{T_{sd}} - \phi_{E_{sd}}}{\phi_{T_{sd}}}. \quad (63)$$

The results of eqs. 61, 62 or 63 are used to determine the cation concentration per unit pore volume of the laminar sand fraction using the Hilll, Shirely & Klein equation $$Q_{v_{disp,sd}} = \frac{S_{wb_{disp,sd}}}{\left(\frac{0.084}{\sqrt{C_0}} + 0.22\right)} \quad (64)$$

where $$C = \frac{NaCl_{ppm}}{58.443 \cdot 1000} \text{ or } \frac{gm/liter\_NaCl}{atomic\_weight\_NaCl} = \frac{gm/liter\_NaCl}{58.443} \quad (65)$$

The concentration of NaCl in ppm of the formation water at 75° F. is determined by ppm=$10^x$ where $$X = \frac{4.562 - \log(Rw_{75} - 0.0123)}{0.955} \quad (66)$$

where $Rw_{75}$ is the resistivity measured at 75° F.

Referring again to FIG. 7, the next step of the invention is the determination of a true "dual ater" equivalent of the Waxman-Smits equation 413. The Waxman Smits water saturation equation for the laminar sand fraction containing dispersed clays only is $$S_{wt_{sd}}^{n^*} = \frac{C_{sd}}{\phi_{T_{sd}}^{m^*} \cdot C_{we_{sd}}}$$

where $$C_{we_{sd}} = C_w + \frac{B \cdot Q_{v_{disp,sd}}}{S_{wt_{sd}}} \quad (67)$$

The term $Q_v$, cations per unit pore volume, determines the additive conductivity and electrical behavior of the pore filling, pore lining dispersed shales. The 'B' term is a constant for the NaCl equivalent ionic conductance of the aly-exchange cations and temperature effects.

The dual water form of the $C_{we}$ term for the laminar sand fraction containing only the dispersed clay fraction is $$C_{we_{sd}} = C_w + \frac{S_{wb_{disp,sd}}}{S_{wt_{sd}}} \cdot (C_{wb_{disp,sd}} - C_w) \quad (68)$$

In prior art methods, such as with the Cyberlook™ method of Schlumberger Inc. or the MIRIAN™ method of Numar Corporation, $C_{wb,disp,sd}$ is determined from adjacent laminar shales. Adjacent laminar shales commonly have different clay types and variable silt content from the dispersed clay in the sand fraction. This difference is due to depositional processes and post burial diagenesis. This effect is even more pronounced if the dispersed shale fraction of the laminar sand is diagenetic, having been formed by chemical and physical processes after deposition. Adjacent laminar or bedded shales may or may not have any mineralogical relationship with the disperse, pore filling clays. This is the most serious drawback of any bulk volume "dual water" approach and the tensor model of the present invention directly addresses this problem.

Juhasz, 1981, demonstrated with the graphical representation of the Waxman-Smits eq. (FIG. 3, p. 30) that when $Swb_{disp}=Swt_{sd}=1$ the following relationship for the dispersed clay component conductivity, $B \cdot Qv_{disp}$, of the Waxman-Smits equation is equivalent to the difference of the dispersed clay bound water conductivity, $Cwb_{disp}$, and the formation water conductivity, Cw. Therefore, the only correct relationship for Cwe of the dispersed clay component of the laminar sand fraction for both the Waxman & Smits equation and equivalent 'dual water' form of Cwe is stated by $$B \cdot Q_{v_{disp,sd}} = C_{wb_{disp,sd}} - C_w \quad (69)$$

where $S_{wb,disp,sd}=1$.

Factoring this equation to solve for Cwbdisp$_{sd}$, the direct and correct solution of the conductivity of the dispersed clay bound water fraction, Cwbdisp$_{sd}$, of the laminar sand component is (again assuming Swbdisp$_{sd}$=Swt$_{sd}$=1)

$$C_{wb_{disp,sd}} = \frac{B}{Q_{v_{disp,sd}}} + C_w \quad (70)$$

Eq. 70 is the correct water bound conductivity of the dispersed shale using the Waxman-Smits and HSK theory and is independent of the resistivity of the laminar shale component. Using this, together with eq. 68 in eq. 67 gives the correct water saturation for the laminar sand. This is a significant improvement over prior art.

Insertion of the Hill, Shirley, & Klien, 1975, equation for the Qvdisp$_{sd}$ term in the previous equation and the use of the correct Swbdisp$_{sd}$ results in the following equation for determination of Cwbdisp$_{sd}$ $$C_{wb_{disp,sd}} = B \cdot \frac{S_{wb_{disp,sd}}}{\left(\frac{0.084}{\sqrt{C_0}} + 0.22\right)} + C_w \quad (71)$$

This is the correct form of the 'dual water' dispersed shaly sand equation (corrected for laminar shale effects using the tensor model), correctly defining the 'bound water' saturation to be specifically that of the laminar sand dispersed shale fraction only, Swb,disp$_{sd}$ and the bound water conductivity to be specifically that of the dispersed shale fraction only, Cwb,disp$_{sd}$.

Therefore, the following terms for the Waxman & Smits, 1968, for of the dispersed shaly sand equation is EQUAL TO the proposed Juhasz 'dual water' form of the dispersed shaly sand equation and results in the same Swt$_{sd}$ for the laminar sand fraction (corrected for laminar shale porosity and conductivity effects) over the entire range of Swb,disp$_{sd}$, Cwb,disp$_{sd}$, and Swt$_{sd}$.

$$C_{we_{sd}} \equiv C_w + \frac{B \cdot Q_{v_{disp,sd}}}{S_{wt_{sd}}} \equiv C_w + \frac{S_{wb_{disp,sd}}}{S_{wt_{sd}}}\left(C_{wb_{disp,sd}} - C_w\right) \quad (72)$$

Substitution of eq. 62 into eq. 67 gives the water saturation of the laminated sand fraction. This is a very important parameter in hydrocarbon production.

The following notation is used for the dual-water tensorial model discussed above:

$C_{t_h}$, $C_{t_v}$ Horizontal and vertical total conductivity $C_{sd}$ Conductivity of the isotropic sand component $C_{sd_h}$, $C_{sd_v}$ Horizontal and vertical conductivity of the laminar isotropic sand component $C_{sh}$ Conductivity of the isotropic laminated shale component $C_{sh_h}$, $C_{sh_v}$ Horizontal and vertical conductivity of the laminar anisotropic shale component.

$V_{sh_{lamr-TILT}}$ Volume fraction of laminated shale from TILT $C_{th}$, $C_{tv}$ tensor model $V_{sh_{lamr-TS}}$ Volume fraction of laminated shale from Thomas-Steiber (1975) equation $V_{sh_{disp-TILT}}$ Volume fraction of dispersed shale from TILT $C_{th}$, $C_{tv}$ tensor model $V_{h_{disp-TS}}$ Volume fraction of dispersed shale from Thomas-Steiber (1975) equation $V_{SH}$ Total shale volume (laminar +dispersed)

$C_w$ Conductivity of the formation water, laminar sand component $R_w$ Inverse of $C_w$, resistivity of the formation water, laminar sand component $C_{we_{sd}}$ Equivalent formation water conductivity of the laminar sand component with dispersed shale.

$R_{we_{sd}}$ Inverse of $C_{w,ed}$, formation water resistivity, laminar sand component.

$\phi_T$ Total (bulk volume) porosity of the formation $\phi_{T_{sd}}$ Total porosity of laminar sand fraction only $\phi_E$ Total (bulk volume) effective porosity of the formation.

$\phi_{E_{sd}}$ Effective porosity of laminar sand fraction only $S_{wt}$ Total (bulk volume) water saturation (including laminar shale 'bound water volume'

$S_{wt_{sd}}$ Total water saturation of the laminar sand fraction only (including the dispersed 'shale' bound water volume)

$S_{wb}$ Bound water saturation of the total clay fraction $S_{wb_{disp,sd}}$ Dispersed clay bound water saturation of the laminar sand fraction only $S_{wb_{lamr,sh}}$ Laminar 'shale' clay bound water saturation (assumed to be 1 in shales)

a*,m*,n* Clay corrected "Archie's parameters" anisotropic sand noted with subscripts (h, v)

$Q_{v_{disp,sd}}$ Cation Exchange Capacity per unit pore volume (meq cm$^{-3}$) of the dispersed clay of the laminar sand fraction only $\phi_{BW}$ Total shale porosity, equivalent to 'bulk volume clay bound water'

$\phi_{BW_{lamr}}$ Laminar shale porosity, equivalent to 'clay bound water' volume $\phi_{BW_{disp}}$ Dispersed shale porosity, equivalent to 'clay bound water' volume B Equivalent ionic conductance of clay-exchange cations $C_0$ Concentration of NaCl in gm/liter or ppm $\phi_{T_{NMR}}$ NMR 'apparent' total porosity $\phi_{E_{NMR}}$ NMR effective porosity BVM NMR bulk volume movable fluid BVI NMR bulk volume irreducible (capillary bound) fluid CBW NMR 'clay bound water' volume in (porosity), equivalent to $\phi_{BW}$ CBW$_{sh}$ NMR 'clay bound water' volume 100% shale (porosity)

CBW$_{Disp}$ NMR dispersed 'clay bound water' volume (porosity)

CBW$_{Lamr}$ NMR laminar 'clay bound water' volume (porosity)

While the foregoing disclosure is directed to the preferred embodiments of the invention, various modifications will be apparent to those skilled in the art. While specific embodiments of the microresistivity tool and induction logging tool have been discussed above, it is to be understood that the tools may be used either on a wireline or in an MWD environment. It is to be further understood that the anisotropy measurements discussed above with reference to an induction logging tool may also be obtained using a propagation resistivity tool. It is intended that all variations within the scope and spirit of the appended claims be embraced by the foregoing disclosure.

What is claimed is:

1. A method of determining a parameter of interest of a subsurface formation containing a sand and a shale surrounding a borehole, the method comprising:

(a) conveying an electromagnetic logging tool into the borehole and using at least one transmitter and one receiver on the tool to obtain measurements indicative of a horizontal and vertical resistivity of the formation;

(b) obtaining a value for a total porosity of said formation, a fractional volume of the shale in said formation, and a resistivity of the shale in the formation;

(c) using a processor for processing said measurements for obtaining a vertical and horizontal resistivity of the formation;

(d) using a tensor petrophysical model in a processor for obtaining from said vertical and horizontal resistivities, said obtained total porosity, said obtained fractional shale volume and said obtained shale resistivity, the parameter of interest wherein said tensor petrophysical model further comprises:

(I) a laminar shale having bound water therein, and (II) a laminar sand that is at least one of (A) a clean sand, and, (B) a sand having dispersed shale with bound water.

2. The method of claim 1 wherein the parameter of interest is at least one of (i) a porosity of said sand, (ii) a dispersed clay bound water saturation of said sand, (iii) a fractional volume of laminated shale, and, (iv) a fractional volume of dispersed shale.

3. The method of claim 1 wherein said at least one transmitter and said at least one receiver comprise coils oriented in mutually orthogonal directions.

4. The method of claim 1 wherein said total porosity is obtained from at least one of (i) a density logging tool, (ii) a Nuclear Magnetic Resonance tool, (iii) an acoustic logging tool, and (iv) a neutron logging tool.

5. The method of claim 1 wherein said fractional shale volume in the formation is obtained from at least one of (i) a gamma ray logging tool, (ii) a Nuclear Magnetic Resonance tool, (iii) a density logging tool, (iv) a neutron logging tool, (v) an acoustic image of the borehole, (vi) an electrical image of the borehole, (vii) a microresistivity logging tool, (viii) a microresistivity imaging tool, and, (ix) an acoustic logging tool.

6. The method of claim 1 wherein said resistivity of shale in the formation is obtained using one of (i) a resistivity tool, (ii) a galvanic tool having button electrodes thereon, (iii) a high resolution dielectric pad device, and (iv) a high resolution pad induction tool having small sources.

7. The method of claim 1 further comprising using the tensor petrophysical model for obtaining a laminar shale volume, a laminar sand volume, and a laminar sand conductivity.

8. The method of claim 7 wherein obtaining the parameter of interest further comprises using a dual water model.

9. The method of claim 8 wherein obtaining said parameter of interest further comprises using the Waxman-Smits equation.

10. The method of claim 1 wherein the logging tool is selected from the group consisting of (i) a galvanic tool, (ii) an electromagnetic induction tool, and, (iii) an electromagnetic propagation resistivity tool.

11. The method of claim 1 further comprising using a sensor on the logging tool for obtaining an orientation of the tool relative to the subsurface formations and using the determined orientation in obtaining said horizontal resistivity and said vertical resistivity.

12. The method of claim 1 further comprises performing an inversion of the obtained vertical and horizontal resistivities of the formation.

13. The method of claim 12 wherein performing said inversion further comprises:

(i) defining a model including a plurality of layers, each of said plurality of layers having a thickness, a horizontal resistivity and a vertical resistivity; and (ii) iteratively updating the model based on a difference between an output of the model and said obtained horizontal and vertical resistivities.

14. The method of claim 13 further comprising conveying a microresistivity tool into the borehole and using measurements therefrom for defining an initial model.

15. The method of claim 13 wherein performing the inversion further comprises applying a shoulder correction.

16. The method of claim 14 wherein defining an initial model further comprises averaging the measurements from the microresistivity tool over a depth sampling interval.

17. The method of claim 14 wherein the measurements from the resistivity logging tool are limited to those in the proximity of a strike direction of the subsurface formation.

18. The method of claim 12 wherein performing said inversion further comprises obtaining more than one possible solution to the inversion and resolving an ambiguity therein.

19. The method of claim 1 further comprising obtaining a volume fraction of laminated shale in said formation.

20. The method of claim 19 further comprising:

(A) conveying a Nuclear Magnetic Resonance (NMR) logging tool into the formation;

(B) obtaining from said NMR logging tool a clay-bound water volume in said formation, (C) obtaining an NMR clay-bound water volume in a shale within said formation, (C) obtaining from said volume fraction of laminated shale and said NMR clay bound water volume in said shale a NMR laminar clay bound water volume in the formation, and (D) determining a dispersed clay bound water volume as a difference of said obtained clay-bound water volume in said formation and said NMR laminar clay-bound water volume in said formation.

21. A method of determining a parameter of interest of a subsurface formation containing a sand and a shale surrounding a borehole, said formation having a total porosity, a fractional volume of the shale in said formation, a resistivity of the shale in the formation, a horizontal resistivity and a vertical resistivity, the method comprising:

using a tensor petrophysical model in a processor for obtaining from said vertical and horizontal resistivities, said total porosity, said fractional shale volume and said shale resistivity, the parameter of interest wherein said tensor petrophysical model further comprises:

(a) a laminar shale having bound water therein, and (b) a laminar sand that is at least one of (i) a clean sand, and, (ii) a sand having dispersed shale with bound water.

22. The method of claim 21 wherein the parameter of interest is at least one of (i) a porosity of said sand, (ii) a dispersed clay bound water saturation of said sand, (iii) a fractional volume of laminated shale, and, (iv) a fractional volume of dispersed shale.

23. The method of claim 22 further comprising using the tensor petrophysical model for obtaining a laminar shale volume, a laminar sand volume, and a laminar sand conductivity.

24. The method of claim 23 wherein obtaining the parameter of interest further comprises using a dual water model for determining a fractional volume of dispersed shale, a total porosity of the laminar sand, and an effective porosity of the laminar sand.

25. The method of claim 24 wherein obtaining said parameter of interest further comprises using the Waxman-Smits equation.

* * * * *